(12) United States Patent
Fujiwara et al.

(10) Patent No.: US 6,906,809 B2
(45) Date of Patent: Jun. 14, 2005

(54) SURFACE SHAPE MEASURING SYSTEM

(75) Inventors: Hisatoshi Fujiwara, Tokyo (JP); Toru Yoshizawa, Tokyo (JP); Yukitoshi Otani, Tokyo (JP)

(73) Assignee: Yamatake Corporation, Tokyo (JP)

( * ) Notice: Subject to any disclaimer, the term of this patent is extended or adjusted under 35 U.S.C. 154(b) by 208 days.

(21) Appl. No.: 10/343,071

(22) PCT Filed: Jul. 12, 2001

(86) PCT No.: PCT/JP01/06053

§ 371 (c)(1),
(2), (4) Date: May 15, 2003

(87) PCT Pub. No.: WO02/10679

PCT Pub. Date: Feb. 7, 2002

(65) Prior Publication Data

US 2003/0179385 A1 Sep. 25, 2003

(30) Foreign Application Priority Data

Jul. 28, 2000 (JP) .................................... 2000-229907

(51) Int. Cl.[7] .............................................. G01B 11/24
(52) U.S. Cl. ..................................................... 356/605
(58) Field of Search ................................. 356/601–608

(56) References Cited

U.S. PATENT DOCUMENTS

| | | | | |
|---|---|---|---|---|
| 4,564,295 A | * | 1/1986 | Halioua | 356/605 |
| 5,307,151 A | * | 4/1994 | Hof et al. | 356/604 |
| 5,612,786 A | * | 3/1997 | Huber et al. | 356/604 |
| 5,805,502 A | | 9/1998 | Tang et al. | |

FOREIGN PATENT DOCUMENTS

| | | |
|---|---|---|
| JP | 58-221103 A | 12/1983 |
| JP | 06-066527 A | 3/1994 |
| WO | WO 92/05401 A1 | 4/1992 |

OTHER PUBLICATIONS

Tomizawa et al., "Phase Shifting Shadow Moiré Method", Proceedings of JSPE Fall Meeting (1991), p. 677.

* cited by examiner

Primary Examiner—Zandra V. Smith
(74) Attorney, Agent, or Firm—Blakely Sokoloff Taylor & Zafman

(57) ABSTRACT

A grating (3) is disposed to face the measurement target surface of a measurement target object (11). A light source (1) irradiates the grating (3) with illumination light. A camera (6) captures a moire fringe image formed on the grating (3) by light passing through the grating 3 and reflected by the measurement target surface. A moving means (9) changes the distance (H) between the grating 3 and the measurement target surface. An analyzing means (8) performs an analysis process of obtaining 3-D shape information of the measurement target surface from the image picked up by the camera (6) in at least two cases in which the distance (H) is set to different values, and obtains, on the basis of the 3-D shape information in each case and the distance H, true 3-D shape information from which the measurement error caused by the inclination of the measurement target surface is eliminated.

4 Claims, 6 Drawing Sheets

SURFACE SHAPE MEASURING SYSTEM

1. TECHNICAL FIELD

The present invention relates to a surface shape measuring system which measures the surface shape of a relatively flat object such as a compact disk, magnetooptical disk, or hard disk.

2. BACKGROUND ART

Storage media capable of high-density storage such as optical disks are recently in great use. They are required to have high flatness in order to achieve a higher storage density. For this purpose, the surface shape of a storage medium must be checked in a manufacturing process. As a method of performing such surface shape measurement, a moire method has been known. The moire method is a method of measuring the surface shape of an object from the moire fringes (contour lines of a surface shape) produced by superimposing a grating and a grating image deforming in accordance with the shape of the object when light from a point light source passes through the grating and strikes the object.

In the moire method using divergent light, however, the contour line interval (a level difference per moire fringe) increases with an increase in the distance between a grating and an object. This causes an error unless the ordinal number (degree n) of a given moire fringe from the grating surface can be specified. In addition, in the moire method, since only contour lines are displayed, recesses and projections cannot be discriminated. The measurement precision can be improved by reducing the pitch of the grating. If, however, the pitch is reduced, the contrast of the moire fringes decreases. This limits the contour line interval to about 10 $\mu$m at most.

In order to solve such a problem, therefore, a scheme based on a combination of a parallel light moire method and a phase shift method has been proposed (e.g., Japanese Patent Laid-Open No. 7-332956). A characteristic feature of the parallel light moire method is that light from a point light source 21 is converted into parallel light by using a lens 22 to always make the contour line interval constant regardless of the distance from a grating 23, as shown in FIG. 8. For this reason, there is no need to determine a degree n of a moire fringe, and no error based on the contour line interval is caused. When reflected light is used, a contour line interval $\Delta h$ is obtained by only an incident (exit) angle $\theta$ of light and a pitch p of the grating 23 according to the following equation:

$$\Delta h = p/(2 \tan \theta) \quad (1)$$

Referring to FIG. 8, reference numeral 24 denotes a condensing lens for condensing reflected light.

In the conventional moire method using divergent light, an object having a mirror-reflecting surface such as a glass member or silicon wafer cannot be measured because the reflection angle changes in accordance with the incident angle which changes depending on the position (an object having a diffused reflecting surface can be measured because the angle seen by an observer becomes a reflection angle). In contrast to this, according to the parallel light moire method, since an incident angle and reflection angle remain the same regardless of the position, even a mirror surface object can be measured.

In the phase shift method, assuming that discrete information such as contour line fringes is a periodic trigonometric function of a light intensity, the information is handled as continuous information, i.e., the phase of the trigonometric function, to recognize a surface shape with a precision higher than the number of contour line fringes. The phase shift method is disclosed in, for example, Tomizawa and Yoshizawa, "Phase-Shifting Shadow Moire Method", Proceedings of JSPE Fall Meeting (1991), p. 677.

3. DISCLOSURE OF INVENTION

[Problem to be Solved by the Invention]

As described above, even a mirror surface object can be measured by using the parallel light moire method. In practice, however, in using the parallel light moire method, however, if a measurement target object is a mirror surface object, and the measurement target object has an inclined surface, a measurement error is caused, and the surface shape cannot be accurately measured.

The reason why such a problem arises will be described below with reference to FIG. 9. As shown in FIG. 9, if the surface of the mirror surface object inclines with respect to a horizontal plane (a plane parallel to the grating) by $\psi$, a normal L1 to the object surface inclines by $\psi$ with respect to a normal L0 to the horizontal plane. Therefore, the direction of reflected light at the time of incidence of parallel light on a horizontal plane (to be referred to as inclined surface reflected light hereinafter) shifts by $2\psi$ with respect to reflected light at the time of incidence of parallel light on a horizontal plane (to be referred to as a horizontal plane reflected light hereinafter).

In this case, a distance a between an incident point on the object surface and a point on the grating surface which horizontal plane reflected light reaches is obtained by $$a = H \tan \theta \quad (2)$$

where H is the distance between the object surface (incident point) and the grating. In addition, a distance a' between an incident point on the object surface and a point on the grating surface which reflected light reaches when inclined is obtained by $$a' = H \tan(\theta + 2\psi) \quad (3)$$

According to equations (2) and (3), a difference $\Delta a$ between the distances a' and a is given by $$\Delta a = H\{\tan(\theta + 2\psi) - \tan \theta\} \quad (4)$$

As compared with a case wherein parallel light is incident on a horizontal plane, when parallel light is incident on an inclined object surface, contour lines shift by some pitches. Therefore, a measurement error $\delta h$ can be expressed as $$\delta h = (\Delta a/p)\Delta h \quad (5)$$

According to equations (1) and (4), equation (5) can be modified as follows:

$$\delta h = H \times \{\tan(\theta + 2\psi) - \tan \theta\}/(2 \tan \theta) \quad (6)$$

As described above, according to the conventional measurement method, if a measurement target object is a mirror surface object and has an inclined surface, the measurement error $\delta h$ is caused. Note that this problem is common to the moire method and the oblique incident interference method of using interference fringes produced by obliquely incident light as contour line fringes.

The present invention has been made to solve the above problem, and has as its object to provide a surface shape measuring system which can accurately measure the surface shape of a mirror surface object.

[Means of Solution to the Problem]

A surface shape measuring system according to the present invention comprises an optical element for formation of contour line fringes which is disposed to face a measurement target surface of a measurement target object, a light source which irradiates the optical element with illumination light, a camera which captures an image of the contour line fringes formed on the optical element by light passing through the optical element and reflected by the measurement target surface, moving means for changing a distance between the optical element and the measurement target surface, and analyzing means for performing an analysis process of obtaining 3-D shape information of the measurement target surface from an image picked up by the camera in at least two cases in which the distance is set to different values, and obtaining true 3-D shape information from which a measurement error caused by an inclination of the measurement target surface is eliminated, on the basis of the 3-D shape information in each of the cases and the distance.

In an example of the arrangement of the surface shape measuring system according to the present invention, the optical element is a grating, and the contour line fringes are moire fringes formed by superimposing the grating and a grating image passing through the grating and reflected by the measurement target surface.

In an arrangement example of the surface shape measuring system according to the present invention, the optical element is a prism, and the contour line fringes are interference fringes formed by superimposing light reflected by a prism surface and light passing through the prism and reflected by the measurement target surface.

In an arrangement example of the surface shape measuring system according to the present invention, the analyzing means obtains a linear function representing a relationship between the distance and the 3-D shape information on the basis of the 3-D shape information in at least the two cases in which the distance is set to different values, and sets a functional value obtained when the distance is 0 as true 3-D shape information from which the measurement error is eliminated.

4. BRIEF DESCRIPTION OF DRAWINGS

5. BEST MODE FOR CARRYING OUT THE INVENTION

Figure 1:
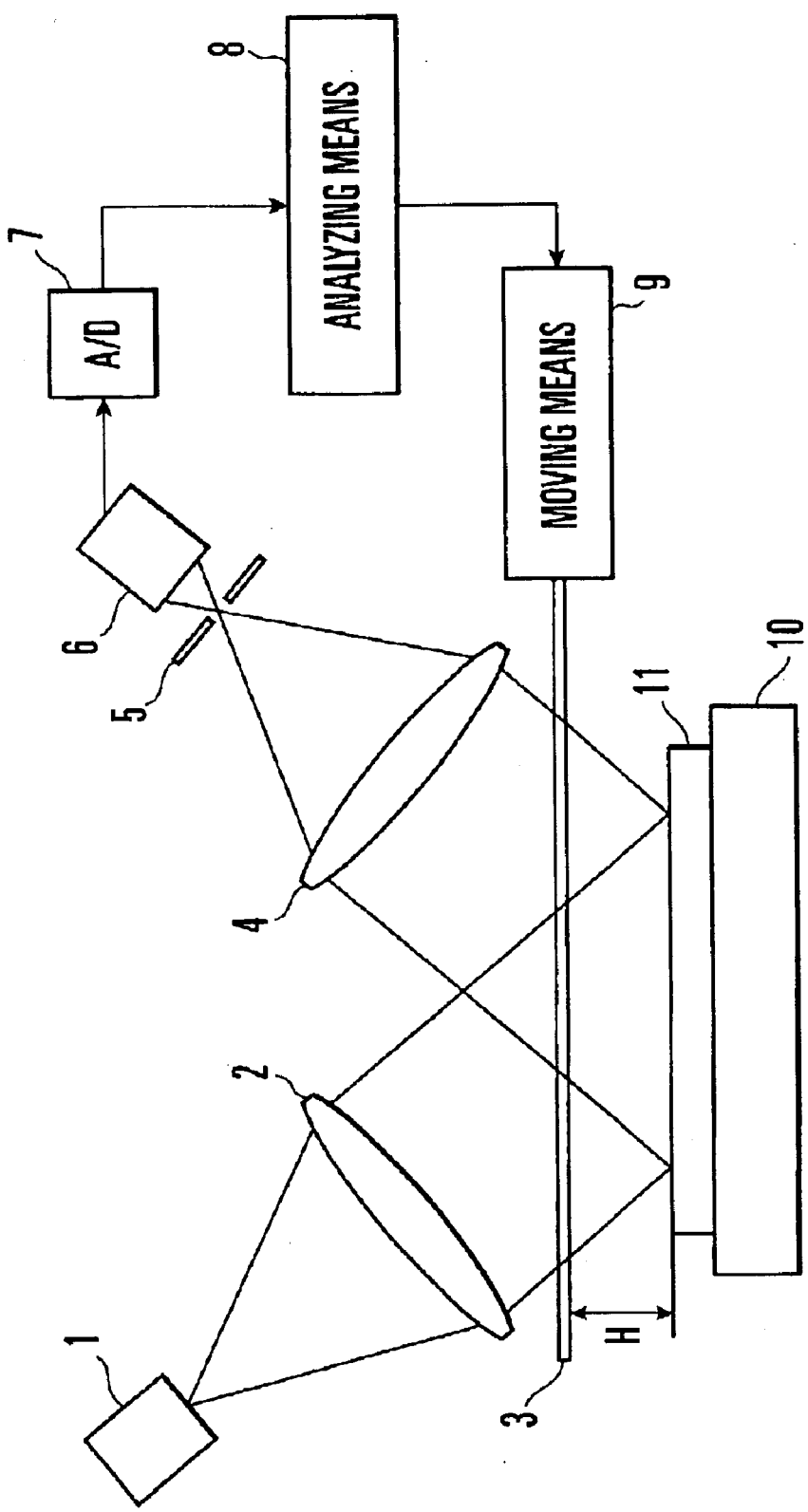
FIG. 1 is a block diagram showing the arrangement of a surface shape measuring system according to an embodiment of the present invention.
Figure 2:
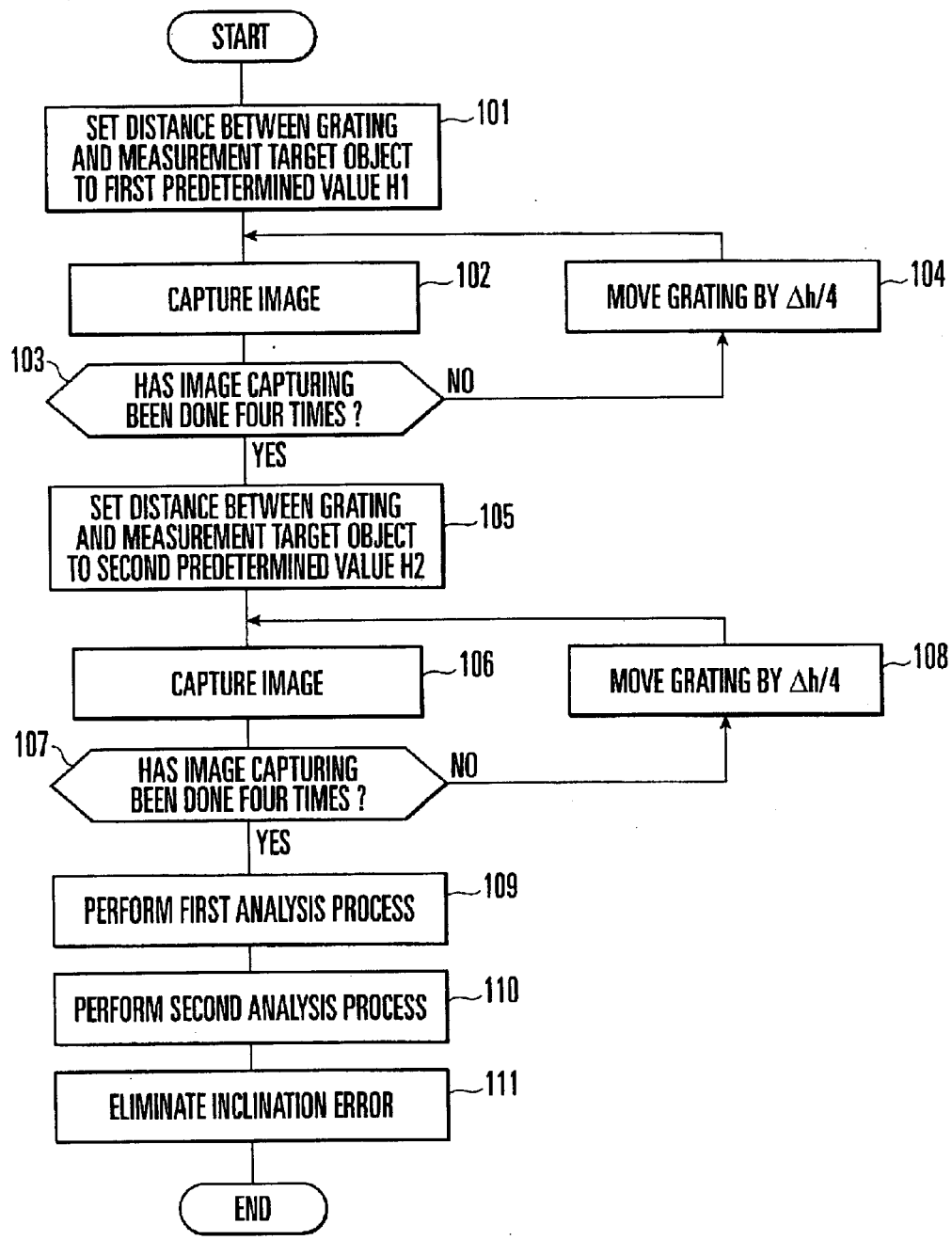
FIG. 2 is a flow chart showing the operation of the surface shape measuring system in FIG. 1.

An embodiment of the present invention will be described in detail next with reference to the accompanying drawings. FIG. 1 is a block diagram showing the arrangement of a surface shape measuring system according to an embodiment of the present invention. FIG. 2 is a flow chart showing the operation of the surface shape measuring system in FIG. 1. The surface shape measuring system in FIG. 1 includes a light source 1 for outputting monochromatic point light such as a helium neon laser beam, a lens 2 for converting the illumination light emitted from the light source 1 into parallel light, a grating 3 which is an optical element disposed to be substantially parallel to the measurement target surface of a measurement target object 11 placed on a stage 10, a condensing lens 4 for condensing the moire fringe image formed by superimposing the grating 3 and a grating image passing through the grating 3 and reflected by the measurement target surface of the measurement target object 11, a slit 5 for capturing only reflected components from the measurement target object 11 by eliminating diffracted components from the grating 3, a camera 6 for capturing a moire fringe image, an A/D converter 7 for converting the image signal output from the camera 6 into digital data, an analyzing means 8 for obtaining 3-D shape information of the measurement target surface from the moire fringe image, and a moving means 9 such as a piezoelectric actuator or stepping motor which changes the distance between the grating 3 and the measurement target surface by vertically moving the grating 3 while keeping it parallel to the measurement target surface. The grating 3 is formed from a glass plate or the like which has light-shielding portions arranged at a predetermined pitch p.

The operation of the surface shape measuring system according to this embodiment will be described below. First of all, the analyzing means 8 controls the moving means 9 to move the grating 3 so as to set a distance H between the grating 3 and the measurement target surface of the measurement target object 11 to a first predetermined value H1 (e.g., 8 mm) (step 101 in FIG. 2).

Subsequently, the analyzing means 8 captures the moire fringe image formed on the measurement target object 11 (step 102). The illumination light emitted from the light source 1 is converted into parallel light by the lens 2. This parallel light passes through the grating 3 and strikes the measurement target object 11 placed on the stage 10 to form the shadow of the grating 3 on the measurement target object 11. As a consequence, the image of the grating 3 which has passed through the grating 3, struck on the object 11, and deformed in accordance with the surface shape of the object 11 is superimposed on the grating 3 to form moire fringes in the form of contour lines corresponding to the surface shape of the object 11.

The moire fringe image is condensed by the condensing lens 4, passes through the slit 5, and strikes the camera 6. The camera 6 converts the incident light into an electrical signal. In this manner, the moire fringe image signal is output from the camera 6. This image signal is converted into digital data by the A/D converter 7. The analyzing means 8 captures the image data output from the A/D converter 7 and stores the image data in an internal memory. With this process, image capturing is completed.

After the image capturing, the analyzing means 8 checks whether image capturing has been done four times (step 103). In this case, since image capturing has not been done four times, the analyzing means 8 controls the moving means 9 to move the grating 3 upward by Δh/4 (step 104), and performs image capturing in step 102 again.

The processing in steps 102 to 104 is repeated until image capturing is done four times. As a consequence, the image data obtained when the distance between the grating 3 and the measurement target object 11 is H1, H1+Δh/4, H1+Δh/2, and H1+3Δh/4 are stored in the memory of the analyzing means 8. Note that an interval Δh between contour line fringes can be calculated by equation (1).

The analyzing means 8 then controls the moving means 9 to move the grating 3 so as to set the distance between the grating 3 and the measurement target surface of the measurement target object 11 to a second predetermined value H2 (e.g., 16 mm) when it is assumed that the measurement target surface is perfectly flat (step 105). The processing in steps 106 to 108 is the same as that in steps 102 to 104. In addition to the above image data corresponding to four image capturing operations, the image data obtained when the distance between the grating 3 and the measurement target object 11 is H2, H2+Δh/4, H2+Δh/2, and H2+3Δh/4 are stored in the memory of the analyzing means 8.

Subsequently, the analyzing means 8 performs the first analysis process of calculating 3-D shape information of the measurement target surface of the measurement target object 11 (a relative distance h(X, Y) between the grating 3 and a point with coordinates (X, Y) on the measurement target surface) by using the phase shift method for the image data corresponding to four image capturing operations which are captured in the processing in steps 101 to 104 (step 109).

Figure 3:
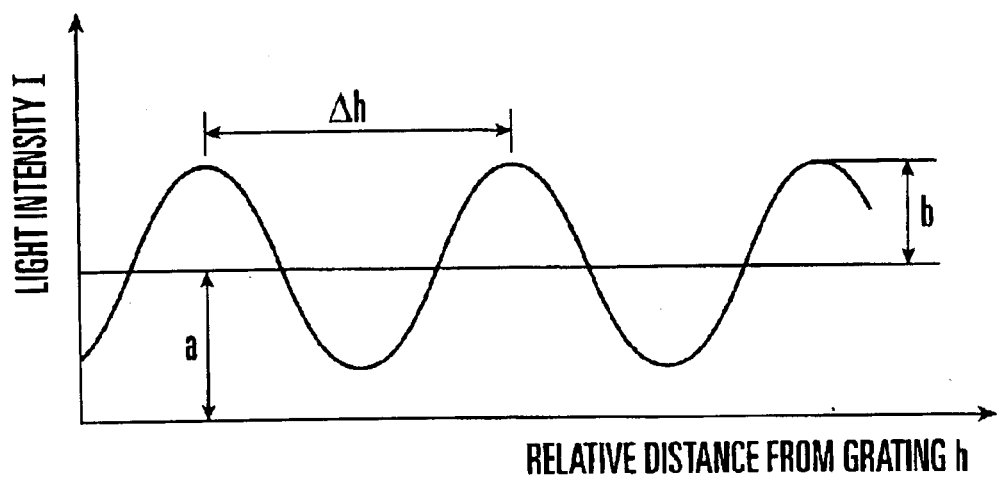
FIG. 3 is a graph showing the relationship between the light intensity and the distance from a grating.

A light intensity I(X, Y) of a moire contour line fringe at coordinates (X, Y) on the measurement target surface of the measurement target object 11 is a periodic function of the relative distance h(X, Y) with respect to the grating 3. Assuming that this periodic function is a sine wave, the light intensity is expressed as shown in FIG. 3 and can be represented as $$I(X, Y) = a(X, Y) + b(X, Y) \times \cos(2\pi h(X, Y)/\Delta h + \phi) \quad (7)$$

where φ is the phase, a(X, Y) is the light intensity offset, and b(X, Y) is the amplitude of light intensity. These values change depending on light source intensity irregularity, a flaw on the lens, the pattern attached to the measurement target object 11, and the reflectance of the measurement target object 11.

In order to obtain the relative distance h(X, Y) between the measurement target object 11 and the grating 3, the unknowns a(X, Y) and b(X, Y) of equation (7) must be eliminated. For this purpose, the phase φ is changed to 0, π/2, π, and 3π/2, and light intensities I0(X, Y), I1(X, Y), I2(X, Y), and I3(X, Y) in the respective cases are obtained. These light intensities in these four cases can be expressed as:

$$I0(X, Y) = a(X, Y) + b(X, Y) \times \cos(2\pi h(X, Y)/\Delta h) \quad (8)$$

$$I1(X, Y) = a(X, Y) + b(X, Y) \times \cos(2\pi h(X, Y)/\Delta h + \pi/2) \\ = a(X, Y) - b(X, Y) \times \sin(2\pi h(X, Y)/\Delta h) \quad (9)$$

$$I2(X, Y) = a(X, Y) + b(X, Y) \times \cos(2\pi h(X, Y)/\Delta h + \pi) \\ = a(X, Y) - b(X, Y) \times \cos(2\pi h(X, Y)/\Delta h) \quad (10)$$

$$I3(X, Y) = a(X, Y) + b(X, Y) \times \cos(2\pi h(X, Y)/\Delta h + 3\pi/2) \\ = a(X, Y) + b(X, Y) \times \sin(2\pi h(X, Y)/\Delta h) \quad (11)$$

The following equation can be obtained by eliminating a(X, Y) by subtracting equation (10) from equation (8):

$$I0(X, Y) - I2(X, y) = 2b(X, Y)\cos(2\pi h(X, Y)/\Delta h) \quad (12)$$

The following equation can be obtained by eliminating a(X, Y) by subtracting equation (9) from equation (11):

$$I3(X, Y) - I1(X, Y) = 2b(X, Y)\sin(2\pi h(X, Y)/\Delta h) \quad (13)$$

According to equations (12) and (13), the relative distance h(X, Y) can be obtained by $$h(X, Y) = (\Delta h/2\pi)\tan^{-1}\{(I3(X, Y) - I1(X, Y))/(I0(X, Y) - I2(X, Y))\} \quad (14)$$

According to equation (14), the relative distance h(X, Y) between the grating 3 and the point with the coordinates (X, Y) on the measurement target surface can be obtained without being influenced by differences in the offset a(X, Y) and amplitude b(X, Y). In order to shift the phase of the moire fringes π/2 at a time, the distance between the measurement target object 11 and the grating 3 is moved Δh/4 at a time, image data corresponding to four image capturing operations is captured, the light intensity I(X, Y) of each image data is obtained for each set of coordinates X and Y, and the relative distance h(X, Y) is obtained by equation (14).

In this case, the light intensity obtained from the image data obtained when the distance between the grating 3 and the measurement target object 11 is H1 is the light intensity I0(X, Y) when the phase φ is 0. The light intensities obtained from the image data corresponding to the distances H1+Δh/4, H1+Δh/2, and H1+3Δh/4 are the light intensities I1(X, Y), I2(X, Y), and I3(X, Y) when the phase φ is π/2, π, and 3π/2. Therefore, the relative distance h(X, Y) can be obtained from the image data which correspond to four image capturing operations and are captured in the processing in steps 101 to 104.

The analyzing means 8 then performs the second analysis process of calculating the 3-D shape information of the measurement target surface of the measurement target object 11 by using the phase shift method for the image data which correspond to four image capturing operations and are captured in the processing in steps 105 to 108 (step 110). The second analysis process can be done in the same manner as the first analysis process.

That is, the light intensities obtained from the image data obtained when the distance between the grating 3 and the measurement target object 11 is H2, H2+Δh/4, H2+Δh/2, and H2+3Δh/4 are the light intensities I0(X, Y), I1(X, Y), I2(X, Y), and I3(X, Y) when the phase φ is 0, π/2, π, and 3π/2. The relative distance h(X, Y) can therefore be obtained from the image data which correspond to four image capturing operations and are captured in the processing in steps 105 to 108 by using equation (14).

The analyzing means 8 then eliminates a measurement error δh caused by the inclination of the measurement target surface from the relative distances h(X, Y) calculated in steps 109 and 110 (step 111). As indicated by equation (6), the measurement error δh is proportional to the distance H between the grating 3 and the measurement target object 11. Therefore, letting h1(X, Y) be the distance calculated in step 109 from the image data corresponding to four image capturing operations in steps 101 to 104, and h2(X, Y) be the distance calculated in step 110 from the image data corresponding to four image capturing operations in steps 105 to 108, a true measurement value h0(X, Y) after the elimination of the measurement error δh can be given by $$h0(X, Y) = h1(X, Y) - h1(X, Y) \times (h1(X, Y) - h2(X, Y))/(H1 - H2) \quad (15)$$

Figure 4:
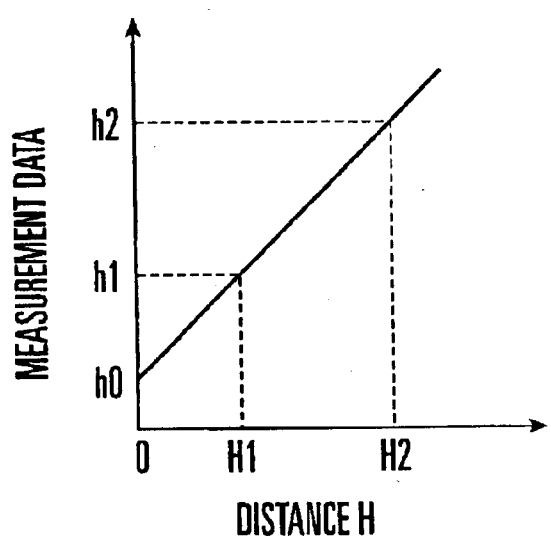
FIG. 4 is a graph showing the relationship between the measurement data and the distance between the grating and the measurement target surface.

FIG. 4 shows the relationship represented by equation (15). The measurement value h0(X, Y) is the value when the distance H between the grating 3 and the measurement target object 11 is 0. As a condition in which equation (15) holds, it is required that the distances H1 and H2 be sufficiently large with respect to the maximum value (e.g., about 10 to 100 μm) of the level differences on the measurement target surface of the measurement target object 11.

The distances H1 and H2 are measured by a mechanical detector mounted on the moving means 9, and hence have measurement errors. For this reason, H2 is set to be about two to three times H1, so the difference between H1 and H2 becomes sufficiently large with respect to the maximum value of the level differences. Another condition for the determination of the distances H1 and H2 is that the contrast of moire fringes is clear. In consideration of the above conditions, in this embodiment, H1 is set to 8 mm, and H2 is set to 16 mm.

In this manner, the true height h0(X, Y) of the object surface after the elimination of the measurement error δh can be calculated by equation (15).

Figure 5:
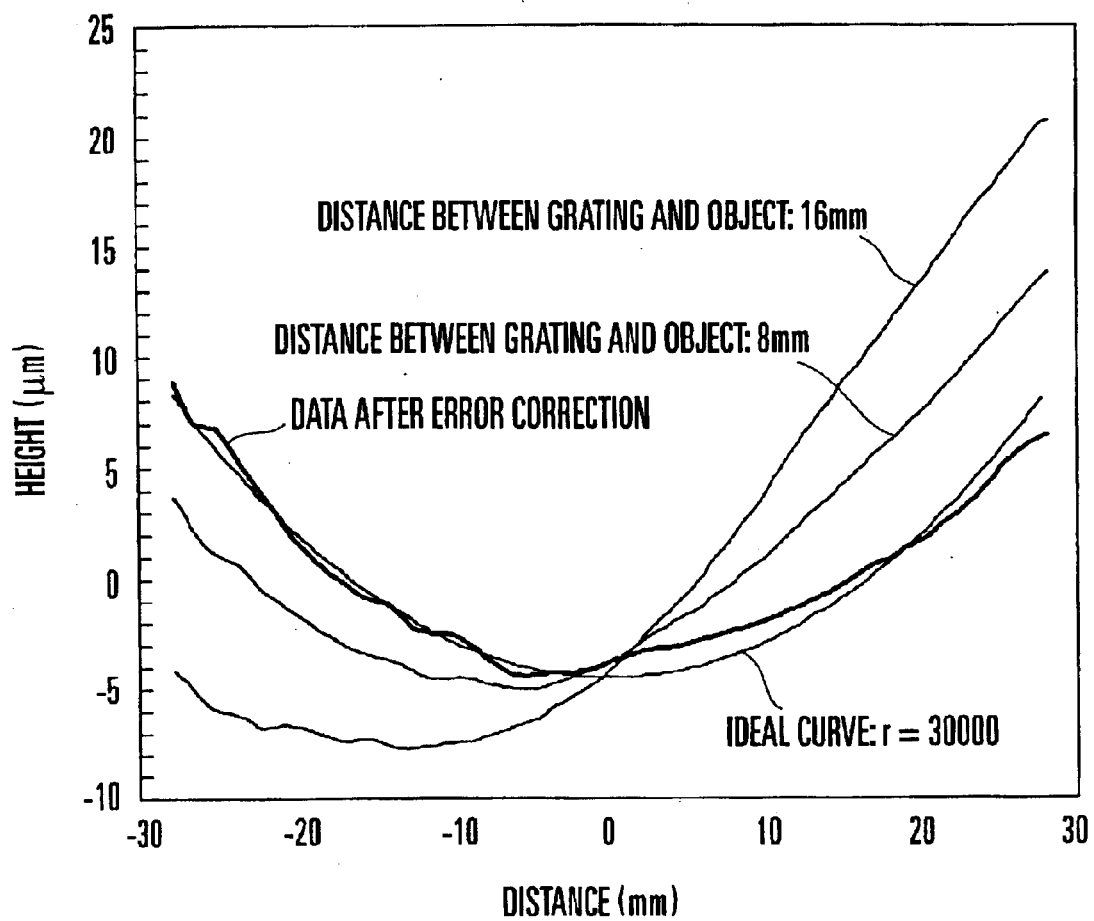
FIG. 5 is a graph showing an example of the measurement result obtained by the surface shape measuring system in FIG. 1.

FIG. 5 shows an example of the measurement result obtained by the surface shape measuring system according to this embodiment. FIG. 5 shows the result obtained by measuring the shape of the concave surface of a concave mirror as the measurement target object 11, which has a radius of 30,000 mm. As is obvious, although the measurement data obtained when the distance H is 8 mm and 16 mm greatly deviate from the ideal curve, the data after error correction in step 111 is brought close to the ideal curve.

Figure 6:
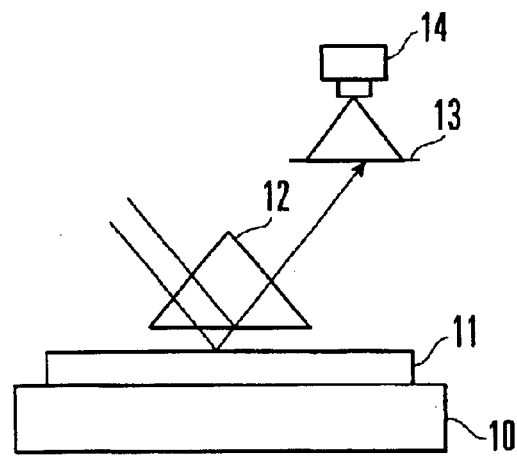
FIG. 6 is a view for explaining an oblique incident interference method.

In this embodiment, error correction according to the present invention is applied to a combination of the parallel light moire method and the phase shift method. However, the present invention may be applied to the oblique incident interference method. As shown in FIG. 6, in the oblique incident interference method, a prism 12 is disposed as an optical element to face the measurement target surface of the measurement target object 11. The prism 12 is irradiated with illumination light. The light reflected by the prism surface is then superimposed on the light which passes through the prism 12, is reflected by the measurement target surface, and strikes the prism 12 again, thereby forming interference fringes on a screen 13. These interference fringes are picked up by a camera 14 to obtain 3-D shape information on the basis of the interference fringe image.

Figure 7:
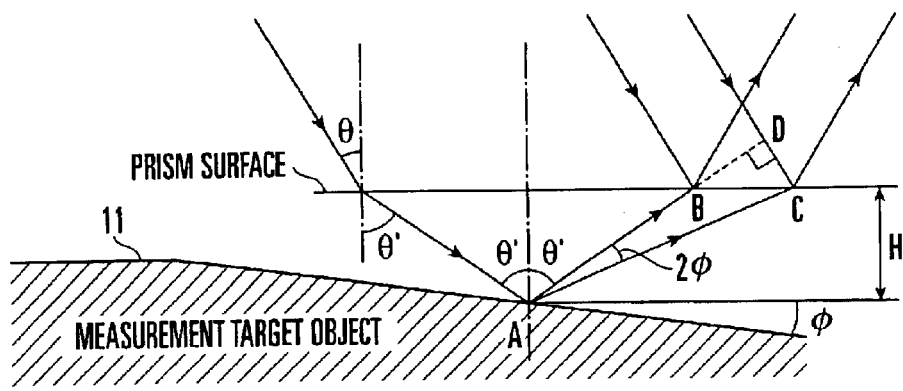
FIG. 7 is a view for explaining the reason why a measurement error is caused in the oblique incident interference method.
Figure 8:
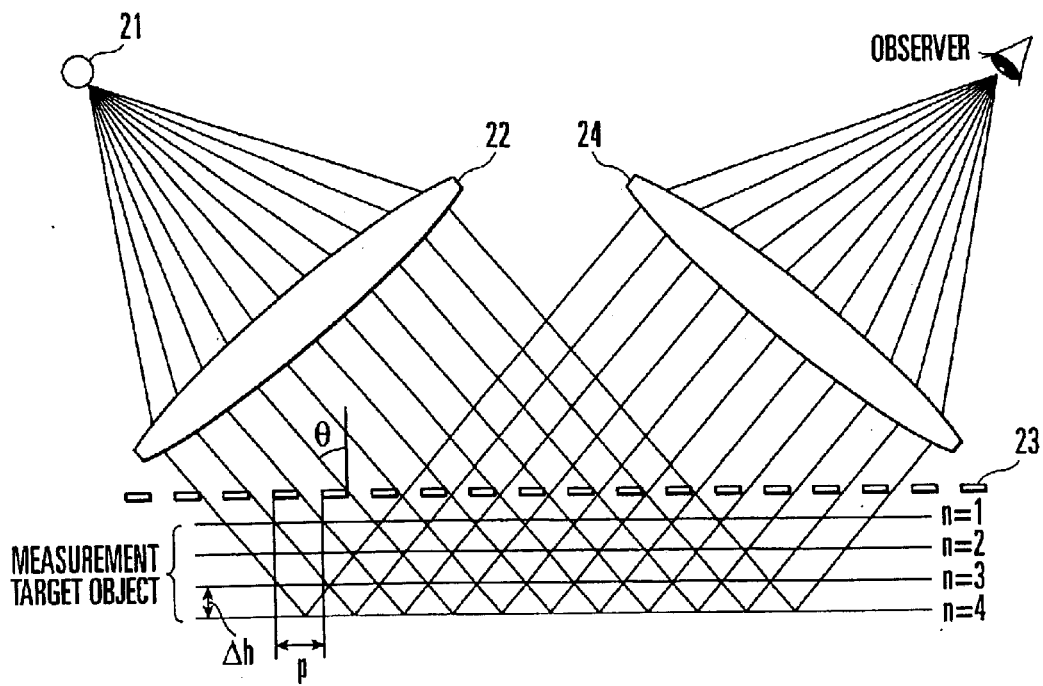
FIG. 8 is a view for explaining a conventional parallel light moire method.
Figure 9:
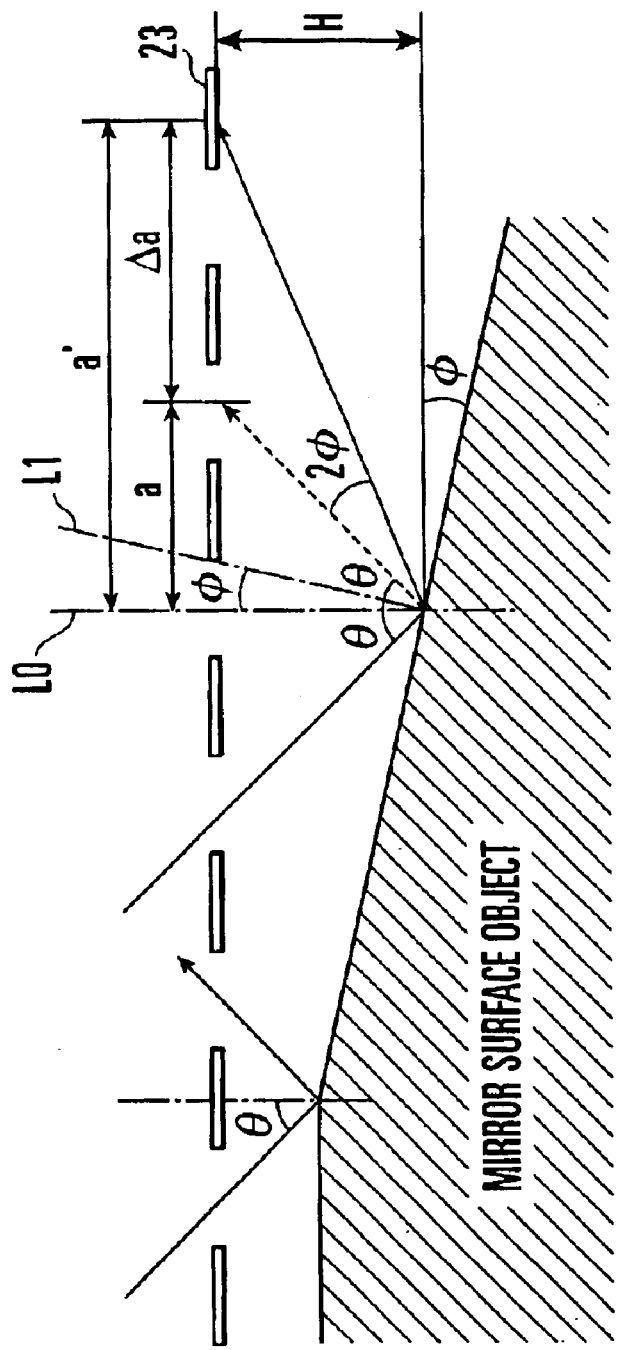
FIG. 9 is a view for explaining the reason why a measurement error is caused on a mirror surface object.

In this oblique incident interference method, the phase difference obtained when the measurement target surface of the measurement target object 11 inclines from a horizontal plane by ψ becomes the measurement error δh. This measurement error δh is expressed as $$\delta h = (2\pi/\lambda)\{(AC - AB)\} - nDC) \quad (16)$$

where λ is the wavelength of incident light, n is the degree, and AC, AB, and DC are the distance between a point A and a point C, the distance between the point A and a point B, and the distance between a point D and the point C in FIG. 7. The distances AC, AB, and DC can be obtained as follows:

$$AC = \{1/\cos(\theta' + \psi)\}H \quad (17)$$

$$AB = \{1/\cos \theta'\}H \quad (18)$$

$$DC = BC \sin(90 - \theta) \quad (19)$$

According to equation (19), the distance BC between the point B and the point C is obtained by $$BC = H\{\tan(\theta + 2\psi) - \tan \theta\} \quad (20)$$

As described above, since the measurement error δh in the oblique incident interference method is proportional to the distance H between the prism 12 and the measurement target surface (point A) of the measurement target object 11, the measurement error can be eliminated by applying the present invention.

In addition, in this embodiment, the 3-D shape information h1(X, Y) and 3-D shape information h2(X, Y) are obtained when the distance between the grating 3 and the measurement target object 11 is H1 and H2, and the true 3-D shape information h0(X, Y) is obtained from these pieces of information. However, the distance H may be set to three or more values. In this case, 3-D shape information may be obtained for each distance H in the same manner as in the first embodiment, a linear function (a function representing the straight line in FIG. 4) representing the relationship between the distance H and the 3-D shape information may be obtained from these pieces of 3-D shape information by using the least squares method, and a functional value when the distance H is 0 may be obtained as the true 3-D shape information h0(X, Y) from this function.

In addition, in this embodiment, the measurement target surface of the measurement target object 11 is substantially parallel to the grating 3. In practice, however, the grating 3 has a slight inclination with respect to the measurement target surface (for example, a height of about 100 μm with respect to the measurement target object 11 100 mm square). This is because it prevents reflected/diffracted light from the grating 3 from striking the camera 6. Reflected/diffracted light from the grating 3 is offset from the optical path of reflected/diffracted light from the measurement target surface of the measurement target object 11 and shielded by the slit 5. This light is not therefore projected on the camera 6. Note that since the inclination of the grating 3 is small, it has no influence on the calculation in step 111.

In this embodiment, a helium neon laser as a monochromatic light source having a short coherent length is used as the light source 1. However, the present invention is not limited to this. A combination of sodium lamp or mercury lamp as an incoherent light source and a filter that transmits only a specific emission spectrum may be used.

As has been described above, according to this embodiment, an analysis process of obtaining the 3-D shape information of a measurement target surface from the image picked up by the camera 6 is performed in at least two cases in which the distance between an optical element and the measurement target surface is set to different values, and a computation is performed on the basis of the 3-D shape information obtained in each case and the distance, thereby obtaining true 3-D shape information from which the measurement error caused by the inclination of the measurement target surface is eliminated. As a consequence, the surface shape of a mirror surface object can be accurately measured.

6. INDUSTRIAL APPLICABILITY

As described above, the present invention is suitable for the measurement of the surface shape of a mirror surface object.

What is claim is:

1. A surface shape measuring system characterized by comprising:

an optical element for formation of contour line fringes which is disposed to face a measurement target surface of a measurement target object;

a light source which irradiates said optical element with illumination light;

a camera which captures an image of the contour line fringes formed on said optical element by light passing through said optical element and reflected by the measurement target surface;

moving means for changing a distance between said optical element and the measurement target surface; and analyzing means for performing an analysis process of obtaining 3-D shape information of the measurement target surface from an image picked up by said camera in at least two cases in which the distance is set to different values, and obtaining true 3-D shape information from which a measurement error caused by an inclination of the measurement target surface is eliminated, on the basis of the 3-D shape information in each of the cases and the distance.

2. A surface shape measuring system according to claim 1, characterized in that said optical element is a grating, and the contour line fringes are moire fringes formed by superimposing said grating and a grating image passing through said grating and reflected by the measurement target surface.

3. A surface shape measuring system according to claim 1, characterized in that said optical element is a prism, and the contour line fringes are interference fringes formed by superimposing light passing through said prism and reflected by the measurement target surface and light reflected by a prism surface.

4. A surface shape measuring system according to claim 1, characterized in that said analyzing means obtains a linear function representing a relationship between the distance and the 3-D shape information on the basis of the 3-D shape information in at least the two cases in which the distance is set to different values, and sets a functional value obtained when the distance is 0 as true 3-D shape information from which the measurement error is eliminated.

* * * * *